United States Patent
Kwatra et al.

(10) Patent No.: US 11,733,666 B2
(45) Date of Patent: Aug. 22, 2023

(54) SMART HOME BUBBLE CREATION

(71) Applicant: International Business Machines Corporation, Armonk, NY (US)

(72) Inventors: Shikhar Kwatra, San Jose, CA (US); Adam Lee Griffin, Dubuque, IA (US); Liam S. Harpur, Dublin (IE); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 17/022,665

(22) Filed: Sep. 16, 2020

(65) Prior Publication Data

US 2022/0083016 A1 Mar. 17, 2022

(51) Int. Cl.
*G05B 13/00* (2006.01)
*G05B 19/042* (2006.01)
*G06N 3/02* (2006.01)

(52) U.S. Cl.
CPC ........... *G05B 19/042* (2013.01); *G05B 13/00* (2013.01); *G06N 3/02* (2013.01); *G05B 2219/2642* (2013.01)

(58) Field of Classification Search
None
See application file for complete search history.

(56) References Cited

U.S. PATENT DOCUMENTS

| 9,967,366 B2 | 5/2018 | Hao et al. |
| 2002/0099823 A1 | 7/2002 | Jemes et al. |
| 2006/0021001 A1 | 1/2006 | Giles et al. |
| 2015/0019714 A1 | 1/2015 | Shaashua et al. |
| 2015/0161152 A1 | 6/2015 | Voyentzie et al. |
| 2015/0227118 A1* | 8/2015 | Wong ............... G05B 15/02 700/44 |
| 2016/0044032 A1 | 2/2016 | Kim et al. |
| 2016/0087933 A1 | 3/2016 | Johnson et al. |
| 2016/0350654 A1 | 12/2016 | Lee |
| 2017/0094706 A1* | 3/2017 | Kim ............... H04W 4/08 |
| 2018/0300645 A1* | 10/2018 | Segal ............... G06N 20/00 |

(Continued)

FOREIGN PATENT DOCUMENTS

| CN | 104133427 A | 11/2014 |
| CN | 109344992 A | 2/2019 |

(Continued)

OTHER PUBLICATIONS

Swanner, N., "MIT researchers have created a way to make Wi-Fi signals really accurate (and creepy)", 3 pages, found at the following website: thenextweb.com/creativity/2016/03/31/mit-wifi-accurate.

(Continued)

*Primary Examiner* — Emilio J Saavedra
(74) *Attorney, Agent, or Firm* — Kelsey M. Skodje

(57) ABSTRACT

A second action is identified by the edged device. The second action is associated with a second networked device of the plurality of networked devices in the environment. The second networked device is unrelated to the first networked device. A relationship is detected between the first networked device and the second networked device by the edge device. A network device bubble is generated by the edge device. The network device bubble is based on the relationship that is detected.

20 Claims, 5 Drawing Sheets

(56) References Cited

U.S. PATENT DOCUMENTS

| | | | |
|---|---|---|---|
| 2019/0215184 A1* | 7/2019 | Emigh | H04L 12/282 |
| 2019/0306786 A1* | 10/2019 | Gould | H04L 61/103 |
| 2019/0349213 A1* | 11/2019 | Shive | G05B 15/02 |
| 2019/0387556 A1 | 12/2019 | Satyanarayana et al. | |

FOREIGN PATENT DOCUMENTS

| | | |
|---|---|---|
| CN | 110989430 A | 4/2020 |
| CN | 111290284 A | 6/2020 |
| WO | 2022057660 A1 | 3/2022 |

OTHER PUBLICATIONS

"Amazon error allowed Alexa user to eavesdrop on another home", Technology News, Reuters, 8 pages, Dec. 20, 2018, found at the following website: www.reuters.com/article/us-amazon-data-security/amazon-error-allowed-alexa-userto-eavesdrop-on-another-home-idUSKCN1OJ15J.

Saito, A Secure Multiple Ad Hoc Networks Management for Ubiquitous Spontaneous Computing, Diss. Tokyo Denki University, 79 pages, 2004.

Krytska et al., "Data Mining Techniques for IOT Analytics", visnik.snu.edu.ua, 10 pages, 2019.

Cao et al., "Analytics Everywhere for streaming IoT data." 2019 Sixth International Conference on Internet of Things: Systems, Management and Security (IOTSMS). IEEE, 8 pages, 2019.

International Search Report and Written Opinion, International Application No. PCT/CN2021/116712, International Filing Date Sep. 6, 2021, 10 pages.

* cited by examiner

SMART HOME BUBBLE CREATION

BACKGROUND

The present disclosure relates to smart homes, and more specifically, to identifying a relationships and surfacing bubbles of multiple actions in a smart home.

Smart homes may include common household items with a network connection (e.g., networked devices). The networked devices may use the network connection to communicate with each other and with a user. The networked devices may perform various actions (e.g., playing music, turning on a light) based on a request from a user.

SUMMARY

According to embodiments, disclosed are a method, system, and computer program product. A first action is identified at a first time by an edge device. The first action is associated with a first networked device of a plurality of networked devices in an environment;

A second action is identified by the edged device. The second action is associated with a second networked device of the plurality of networked devices in the environment. The second networked device is unrelated to the first networked device. A relationship is detected between the first networked device and the second networked device by the edge device. A network device bubble is generated by the edge device. The network device bubble is based on the relationship that is detected.

According to embodiments, the network device bubble may coordinate data and actions for devices having relationships.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
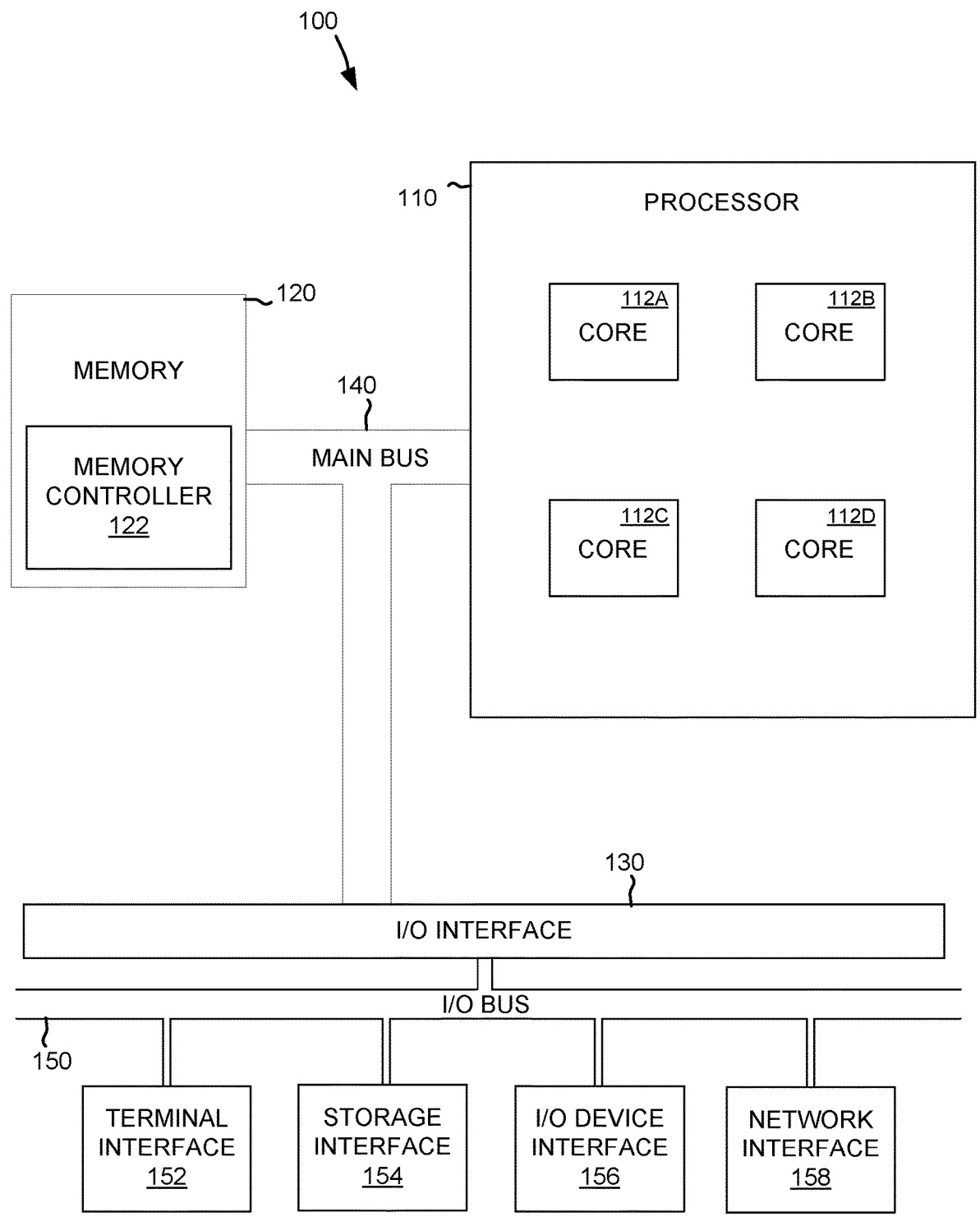
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to smart homes, more particular aspects relate to surfacing bubbles of multiple actions in a smart home. While the present disclosure is not necessarily limited to such applications, various aspects of the disclosure may be appreciated through a discussion of various examples using this context.

Smart homes may include common household items with a network connection (e.g., networked devices) in an environment. An environment may be a home, an office, a library, a school, or another living space with one or more spaces or areas. The networked devices may use the network connection to communicate with each other and with a user. The networked devices may perform various actions (e.g., playing music, turning on a light) based on a request from a user. Smart homes have become increasingly popular. Likewise, networked devices have proliferated as technology advances. For example, the cost of microprocessors, network equipment, and environment sensors have drastically reduced over time. The popularity and proliferation of such devices may lead to an abundance, over abundance, or crowding of smart devices within certain environments.

The smart home may have various issues associated with the popularity of networked devices. One issue may be the sub-optimal visibility and setup of networked devices. For example, networked devices may rely on a disparate setup of protocols, variety of network standards, and redundant application interactions. The sub-optimal visibility and setup of networked devices may lead to user frustration. For example, a user may wish to adjust the lighting of a smart outlet that is a networked device in concert with a smart television networked device to adjust lighting for watching a program in a den of a home. The user may be required to operate multiple applications, use tedious menus, and/or repeat lengthy voice interactions.

Another issue is unintended use of a networked device. In a first example, if a first user intends to send a clip of streaming content to a streaming device, but through such accidental or deliberate manipulation by a third party, the streaming content may be sent to an un-intended device. This un-intended device may be a neighbor's device in a neighboring room/floor/office or apartment building. In a second example, a first user may have access to a second user's networked devices, such as smart appliances, smart speakers, and the like, due to the proximity to a networked device or broadcast of credentials. In a third example, a networked device, such as a voice assistant or smart router, may automatically bridge two networks or networked devices so that unintended visibility between devices is successful.

A bubble-based smart home (BBSH) may overcome the issues related to networked devices in such an environment. A BBSH may operate by performing identification and detection of relationships between devices. The BBSH may operate by performing machine learning, or another form of artificial intelligence regarding the operations of various smart home environments. The BBSH may operate by identifying one or more actions that are taken in a smart home environment (environment). The BBSH may identify actions that are unrelated to each other. For example, a BBSH may be configured to scan for actions that are performed on devices that are on a first network, such as a first wireless network. The BBSH may be further configured to scan for actions that are performed on devices that are on a second network. In another example, a BBSH may be configured to scan for actions that are performed on a first device. The BBSH may be configured to also identify an unrelated second device and actions that are directed to the unrelated second device.

The BBSH may be configured to detect relationships. The BBSH may be configured to detect a relationship based on the actions taken by a user—for example: by relating a user's order of performing operations; by relating a user's location within the environment; or by relating a time component, such as a few seconds or minutes between a first action and a second action.

The BBSH may be configured to detect a relationship based on one or more devices within an environment. For example, the BBSH may be configured to operate by relating a first networked device to a second networked device. For example, the BBSH may be configured to operate by relating actions of a first device to actions of a second device based on their relative distance to each other, another device, or the user. The BBSH may be configured to operate by relating an action directed at two separate devices based on an action to a third device. For example, a BBSH may operate by receiving commands through an interface of a computer, or through voice commands of a voice assistant. By receiving commands from the third device and directed to unrelated devices, the BBSH may detect that a relationship is present.

The BBSH may detect a relationship by modeling or interpreting an underlying interface of the networked devices. In detail, networked devices may operate in two different operating modes including a pairing mode and a listening mode. In the listening mode, the networked device may be configured to perform actions that are requested by a user or from another device on the same network. Networked devices may operate in the pairing mode before operating in the listening mode. Stated another way, a prerequisite for operating in a listening mode may be to perform pairing in the pairing mode. In the pairing mode, a networked device may be actively searching for or attempting to join a network in control of a user or owner of the environment. For example, a smart speaker may operate in a pairing mode by attempting to join or by being open to receive commands from a user through an interface of a third-party device. The third-party device may be a computer graphical user interface (GUI), or other third-party device configured to receive commands.

The BBSH may automatically pair with the networked device while in the listening mode (e.g., the BBSH may accept the request by the new networked device to join a network of the BBSH). In detail, a BBSH may detect one or more attempts by a new networked device to try and join a network or may detect scans or pings by a net networked device. The BBSH may respond and pair with the new networked device directly. By automatically pairing, the BBSH may prevent an unauthorized third party (e.g., a neighbor) from pairing with the networked device. After the networked device is paired to the network by the BBSH, the networked device may be prevented from receiving transmissions from devices on the network that are not the BBSH. In some embodiments, the BBSH may present the newly paired networked device to a user in an unauthorized mode. In detail, the BBSH may present the newly paired device but may prompt a user to verify or confirm their ownership, membership, authorization, or other relevant relationship, to the network of networked devices (e.g., the smart home). The prompt, in the unauthorized mode, may be for a user in the smart home to verify a relationship to the smart home. For example, the BBSH may present that a newly paired smart speaker (a new networked device) is now available in the smart home on a smartphone of the user (a first existing networked device). Upon receiving a request through a first interface of the smartphone, the BBSH may instruct the user to verify permission through a second existing networked device, such as a desktop computer or a voice assistant. In some embodiments, only after a verification or authentication by a user, may the BBSH be configured to surface, present, or otherwise permit the newly added networked device to the rest of the networked devices of a smart home.

The BBSH may operate based on an edge device in the environment. An edge device may be a computing device that operates local to an environment, such as a desktop PC, a smartphone, or another computer having memory, input/output, and processing power. For example, one or more of the networked devices may include the proper amount of processing power, such as a computer with sufficient RAM, CPU, and input/output for performing operations of the BBSH. In some embodiments, the BBSH may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The BBSH may use the modeling to generate networked devices bubbles. The networked device bubbles may be paired with user-facing identifies that are related to a plurality of actions in the smart home. In detail, based on observing actions that are trigger actions and based on user behavior a networked device bubble may be created based on a relationship between entities or based on a context or commonality of devices. For example, a user's voice command, usage pattern of various devices, and a video feed from a camera, are analyzed via machine learning operating on the BBSH, and home networked device bubbles are generated.

The BBSH may continuously receive information about the environment of networked devices and the user. For example, the BBSH may receive a feed from wearable devices or mobile devices of the user, etc. Accordingly, the user's activities can be recognized. The wearable and mobile devices may record physical activity (e.g., exercise, sleep), mobility patterns (e.g., leaving or entering various rooms), frequency of performing the activities (e.g., how often a user enters a kitchen in the morning during a weekday. In some embodiments, the BBSH may model or detect that there is a relationship by correlating actions of the user and actions directed towards various networked devices in the environment. For example, a BBSH may be configured to monitor and analyze timing of performing actions to request streaming of media, turning on and off lights, and the like. Simultaneously, the BBSH may be configured to monitor the actives of the user based on movement from sensors in the portable, mobile, and wearables of the user. A significant statistical correlation between activity (such as accelerometer and gyroscope data) and subsequent actions of (or commands sent to) a specific networked device can be ascertained over a few weeks in an environment.

The BBSH may leverage a camera located within the environment to identify what activities are also being performed by the user. For example, the BBSH may leverage an image processor (not depicted). The image processor may be a collection of hardware and software, such as an application specific integrated circuit.

The image processor may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a face (e.g., by analyzing images of faces using a model built on training data).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a scene in the environment of a smart home may be analyzed. Using a relevant object detection algorithm, the movement of a user within the environment may be identified.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., a plant, a human face, a dog, etc.) can be output as classifications determined by the supervised machine learning model. For example, if a user snaps an image of a smart speaker, a supervised machine learning algorithm may be configured to output an identity of the object and the environment (e.g., bedroom smart speaker) as well as various characteristics of their vehicle (e.g., the model, color, etc.).

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects, colors of object, and/or other attributes of objects. In some embodiments, the output may generate a list including the identity and/or characteristics of objects. In some embodiments, the output may include an indication that an identity or characteristic of an object is unknown. The indication may include a request for additional input data that can be analyzed such that the identity and/or characteristics of objects may be ascertained. In some embodiments, various objects, object attributes, and relationships between objects (e.g., hierarchical and direct relations) may be represented within a knowledge graph (KG) structure. Objects may be matched to other objects based on shared characteristics, patterns or behaviors to perform, by the BBSH, a determination or understanding of various actions and activities of the user. For example, by analyzing historical mobility pattern, hand movement pattern, duration of time spend in different areas, a BBSH may identify what types of activities are being performed by a user manually, such as loading clothes in a washing machine, cooking, changing settings on a thermostat, and the like.

The networked device bubbles may be considered automatic scenarios, pairings, or other groups of actions to be performed by disparate networked devices. The networked device bubbles may be created from the information that is obtained by the BBSH. The networked device bubbles may be leveraged by the BBSH to perform or initiate further actions, such as performing actions of one or more devices of the networked device bubble. The performance of an action may lead to completing the operations that a user might be attempting to perform, which would reduce confusion or overhead when navigating or interacting with smart home components such as graphical user interfaces and voice-based assistant interfaces.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
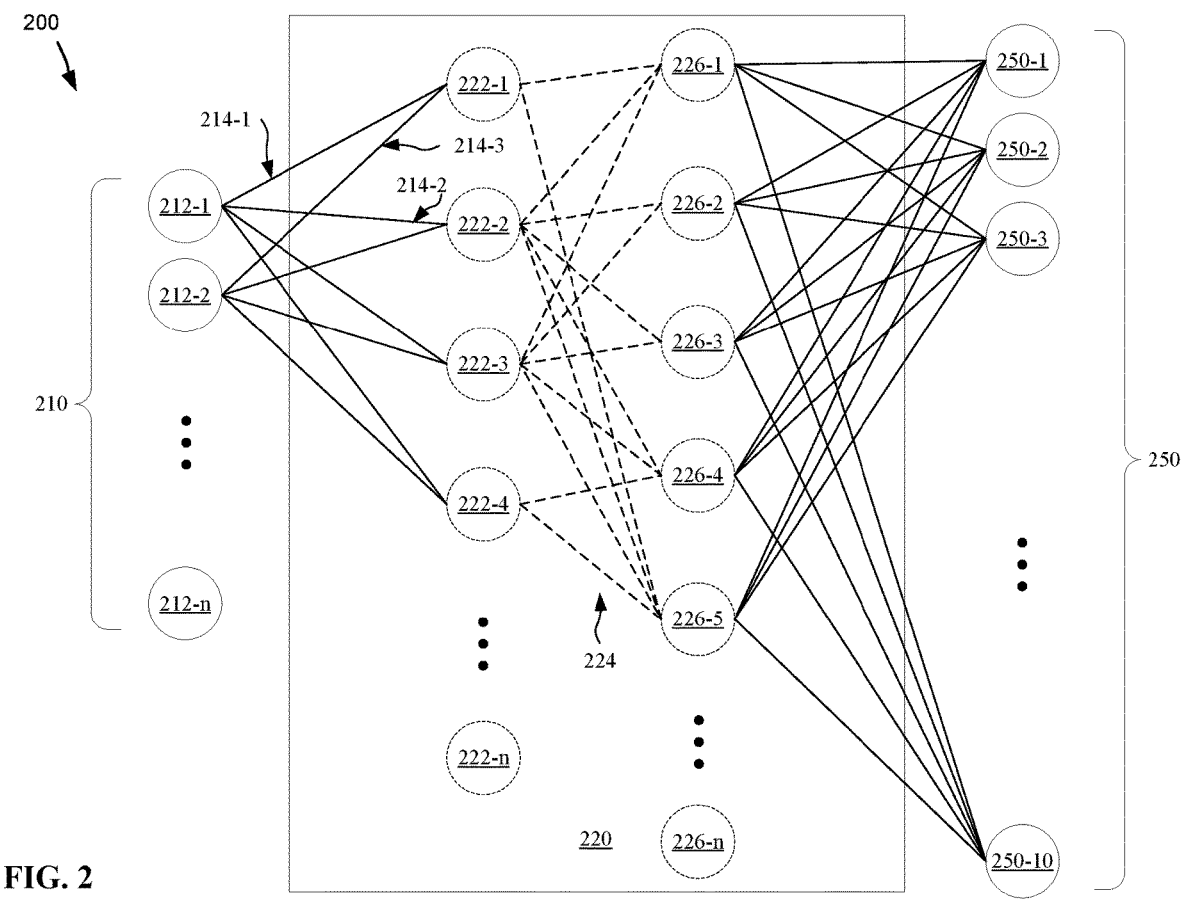
FIG. 2 depicts a model representative of one or more artificial neural networks capable of detecting relationships and generating networked device bubbles consistent with some embodiments of the present disclosure.

FIG. 2 depicts a model 200 representative of one or more artificial neural networks capable of detecting relationships and generating networked device bubbles consistent with embodiments of the present disclosure. The model neural network (neural network) 200 is made up of a plurality of layers. The neural network 200 includes an input layer 210, a hidden section 220, and an output layer 250. Though model 200 depicts a feed-forward neural network, it should be appreciated that other neural networks layouts may also be considered such as a recurrent neural network layout (not depicted). In some embodiments, the neural network 200 may be a design-and-run neural network and the layout depicted by the model may be created by a computer programmer. In some embodiments, the neural network 200 may be a design-by-run neural network and the layout depicted may be generated by the input of data and by the process of analyzing that data according to one or more defined heuristics. The neural network00 may operate in a forward propagation by receiving an input and outputting a result of the input. The neural network00 may adjust the values of various components of the neural network by a backward propagation (back propagation).

The input layer 210 includes a series of input neurons 212-1, 212-2, up to 212-$n$ (collectively, 212) and a series of input connections 214-1, 214-2, 214-3, 214-4, etc (collectively, 214). The input layer 210 represents the input from data that the neural network is supposed to analyze (e.g., a set of characteristics about a particular networked device in the environment, one or heuristics or preferences of a user). Each input neuron 212 may represent a subset of the input data. For example, the neural network 200 is provided with a device identifier as input, and the device identifier is represented by a series of values. In this example, input neuron 212-1 may be the first identifier of a first networked device of an environment, input neuron 212-2 may be the relative latency value of the first networked device, etc. The number of input neurons 212 may correspond to the size of the input. For example, when the neural network is designed to analyze images that are 256 pixels by 256 pixels, the neural network 200 layout may include a series of 65,536 input neurons. The number of input neurons 212 may correspond to the type of input. For example when the input is a color image that is 256 pixels by 256 pixels, the neural network 200 layout may include a series of 196,608 input neurons (65,536 input neurons for the red values of each pixel, 65,536 input neurons for the green values of each pixel, and 65,536 input neurons for the blue values of each pixel). The type of input neurons 212 may correspond to the type of input. In a first example, the neural network 200 may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, the neural network 200 may be designed to analyze images that are color, and each of the input neurons may be a three dimensional vector to represent the color values of a given pixel of the input images (where the first component of the vector is an red whole-number value between 0 and 255, the second component of the vector is an green whole-number value between 0 and 255, and the third component of the vector is an red whole-number value between 0 and 255).

The input connections 214 represents the output of the input neurons 212 to the hidden section 220. Each of the input connections 214 vary depending on the value of each input neuron 212 and based upon a plurality of weights (not depicted). For example, the first input connection 214-1 has a value that is provided to the hidden section 220 based on the input neuron 212-1 and a first weight. Continuing the example, the second input connection 214-2 has a value that is provided to the hidden section 220 based on the input neuron 212-1 and a second weight. Further continuing the example, the third input connection 214-3 based on the input neuron 212-2 and a third weight, etc. Alternatively stated, the input connections 214-1 and 214-2 share the same output component of input neuron 212-1 and the input connections 214-3 and 214-4 share the same output component of input neuron 212-2; all four input connections 214-1, 214-2, 214-3, and 214-4 may have output components of four different weights. Though the neural network 200 may have different weightings for each connection 214, some embodiments may contemplate weights that are similar. In some embodiments, each of the values of the input neurons 212 and the connections 214 may necessarily be stored in memory.

The hidden section 220 includes one or more layers that receive inputs and produce outputs. The hidden section 120 includes a first hidden layer of calculation neurons 222-1, 222-2, 222-3, 222-4, up to 222-n (collectively, 222); a second hidden layer of calculation neurons 226-1, 226-2, 226-3, 226-4, 226-5, up to 226-n (collectively 226); and a series of hidden connections 224 coupling the first hidden layer and the second hidden layer. It should be appreciated that model 200 only depicts one of many neural networks capable of modeling an environment of networked devices as part of a BBSH consistent with some embodiments of the disclosure. Consequently, the hidden section 220 may be configured with more or less hidden layers (e.g., one hidden layer, seven hidden layers, twelve hidden layers, etc.)—two hidden layers are depicted for example purposes.

The first hidden layer 222 includes the calculation neurons 222-1, 222-2, 222-3, 222-4, up to 222-n. Each calculation neuron of the first hidden layer 222 may receive as input one or more of the connections 214. For example, calculation neuron 222-1 receives input connection 214-1 and input connection 214-2. Each calculation neuron of the first hidden layer 222 also provides an output. The output is represented by the dotted lines of hidden connections 224 flowing out of the first hidden layer 222. Each of the calculation neurons 222 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 222 also contains a bias (not depicted). The bias may be used to decide the likelihood or valuation of a given activation function. In some embodiments, each of the values of the biases for each of the calculation neurons must necessarily be stored in memory.

An example of model 200 may include the use of a sigmoid neuron for the activation function of calculation neuron 222-1. An equation (Equation 1, stated below) may represent the activation function of calculation neuron 212-1 as f(neuron). The logic of calculation neuron 222-1 may be the summation of each of the input connections that feed into calculation neuron 222-1 (i.e., input connection 214-1 and input connection 214-3) which are represented in Equation 1 as j. For each j the weight w is multiplied by the value x of the given connected input neuron 212. The bias of the calculation neuron 222-1 is represented as b. Once each input connection j is summed the bias b is subtracted. Finalizing the operations of this example as follows: given a larger positive number results from the summation and bias in activation f(neuron), the output of calculation neuron 222-1 approaches approximately 1; given a larger negative number results from the summation and bias in activation f(neuron), the output of calculation neuron 222-1 approaches approximately 0; and given a number somewhere in between a larger positive number and a larger negative results from the summation and bias in activation f(neuron), the output varies slightly as the weights and biases vary slightly.

$$f(\text{neuron}) = \frac{1}{1 + \exp(-\sum_j w_j x_j - b)} \quad \text{Equation 1}$$

The second hidden layer 226 includes the calculation neurons 226-1, 226-2, 226-3, 226-4, 226-5, up to 226-n. In some embodiments, the calculation neurons of the second hidden layer 226 may operate similarly to the calculation neurons first hidden layer 222. For example, the calculation neurons 226-1 to 226-n may each operate with a similar activation function as the calculation neurons 222-1 to 222-n. In some embodiments, the calculation neurons of the second hidden layer 226 may operate differently to the calculation neurons of the first hidden layer 222. For example, the calculation neurons 226-1 to 226-n may have a first activation function, and the calculation neurons 222-1 to 222-n may have a second activation function.

Likewise, the connectivity to, from, and between the various layers of the hidden section 220 may also vary. For example, the input connections 214 may be fully connected to the first hidden layer 222 and hidden connections 224 may be fully connected from the first hidden layer to the second hidden layer 226. In embodiments, fully connected may mean that each neuron of a given layer may be connected to all the neurons of a previous layer. In embodiments, fully connect may mean that each of neuron of a given layer may function completely independently and do not share any connections. In a second example, the input connections 214 may not be fully connected to the first hidden layer 222 and the hidden connections 224 may not be fully connected from the first hidden layer to the second hidden layer 226.

Also likewise, the parameters to, from, and between the various layers of the hidden section 220 may also vary. In some embodiments, the parameters may include the weights and the biases. In some embodiments, there may be more or less parameters than the weights and biases. For example, the model 200 may be of a convolutional network. The convolutional neural network may include a sequence of heterogeneous layers (e.g., an input layer 210, a convolution layer 222, a pooling layer 226, and an output layer 250). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 250 includes a series of output neurons 250-1, 250-2, 250-3, up-to 250-n (collectively, 250). The output layer 250 holds a result of the analyzation of the neural network 200. In some embodiments, the output layer 250 may be a categorization layer used to identify a feature of the input to the neural network 200. For example, the neural network 200 may be a classification network trained to identify Arabic numerals. In such an example, the neural network 200 may include ten output neurons 250 corresponding to which Arabic numeral the network has identified (e.g., output neuron 250-2 having a higher activation value than output neurons 250 may indicate the neural network determined an image contained the number '1'). In some embodiments, the output layer 250 may be a real-value target (e.g., trying to predict a result when an input is a previous set of results) and there may be only a singular output neuron (not depicted). The output layer 250 is fed from an output connection 252. The output connection 252 provides the activations from the hidden section 220. In some embodiments, the output connections 252 may include weights and the output neurons 250 may include biases.

Training the neural network depicted by the model 200 may include performing back propagation. Back propagation is different from forward propagation. Forward propagation may include feeding of data into the input neurons 210; performing the calculations of the connections 214, 224, 252; and performing the calculations of the calculation neurons 222 and 226. The forward propagation may also be the layout of a given neural network (e.g., recurrence, number of layers, number neurons in one or more layers, layers being fully connected or not to other layers, etc.). Back propagation may be determining an error of the parameters (e.g., the weights and the biases) in the neural network 200 by starting with the output neurons 250 and propagating the error backward through the various connections 252, 224, 214 and layers 226, 222, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination.

For example, neural network 200 may be a classification network; may be provided with a 128 pixel by 250 pixel image input that contains captured image data from a camera or other visual sensor; and may determine that a first networked device is most likely a relevant networked device to be added to an existing network bubble and is second most likely an unrelated networked device not to be added and is third most likely a user moving in an environment. Continuing the example, performing a back propagation may alter the values of the weights of connections 214, 224, and 252; and may alter the values of the biases of the first layer of calculation neurons 222, the second layer of calculation neurons 226, and the output neurons 250. Further continuing the example, the performance of the back propagation may yield a future result that is a more accurate classification of the same 128 pixel by 250 pixel image input that contains depictions of the environment (e.g., more closely ranking an unrelated networked device, a related networked device, then a user in order of most likely to least likely, etc.).

Equation 2 provides an example of the objective function in the form of a quadratic cost function (e.g., mean squared error)—other functions may be selected, and the mean squared error is selected for example purposes. In Equation 2, all of the weights w and biases b of an example network. The example network is provided a given number of training inputs n in a subset (or entirety) of training data that have input values x. The example network may yield output a from x and should yield a desired output y(x) from x. Back propagation or training of the example network should be a reduction or minimization of the objective function 'O(w,b)' via alteration of the set of weights and biases. Successful training of the example network should not only include the reduction of the difference between the example network's answer a and the correct answers y(x) for the input values x, but given new input values (e.g., from additional training data, from validation data, etc.).

$$O(w, b) \equiv \frac{1}{2n}\sum_{x}\|y(x) - a\|^2 \qquad \text{Equation 2}$$

Many options may be utilized for back propagation algorithms in both the objective function (e.g., mean squared error, cross-entropy cost function, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 200 may be small in any given iteration. Back propagation algorithms may need to be repeated many iterations to perform accurate learning as a result of the necessitated smallness of any given iteration.

For example, neural network 200 may have untrained weights and biases, and back propagation may involve the stochastic gradient descent to train the network over a subset of training inputs (e.g., a batch of 10 training inputs from the entirety of the training inputs). Continuing the example, neural network 200 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). In another example, a long short-term memory (LSTM) machine learning technique/network may be leveraged in a smart home as part of BBSH to apply historical data of users, devices, device categorization, location, time, and other variable inputs into trained/learned applications/implementations and suggestions for the creation of new networked device bubbles and/or actions as new data is supplied to the model. Training sequences will leverage optimization algorithms, like gradient descent, combined with backpropagation through time to compute the gradients needed during the optimization process and/or optional other neural networks to complete training through production tactics.

Figure 3:
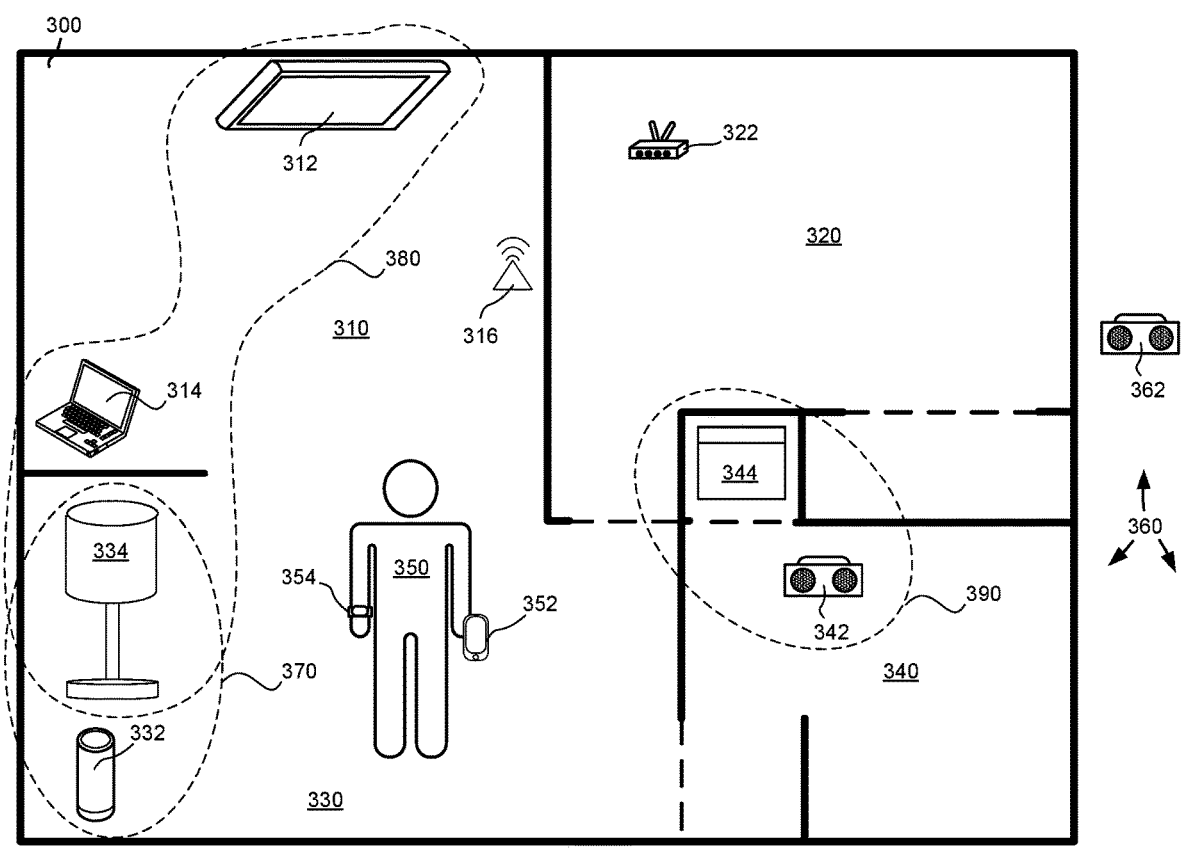
FIG. 3 depicts an example of performing bubble-based smart home (BBSH) in a real-world environment, consistent with some embodiments of the disclosure.

FIG. 3 depicts an example of performing BBSH in a real-world environment 300, consistent with some embodiments of the disclosure. The environment 300 may be a smart home, such as a residential living space. The residential living space is depicted for example purposes. In some embodiments, the environment 300 may be an office setting or other area.

Environment 300 may include one or more rooms including, a first room 310, a second room 320, a third room 330, and a fourth room 340. Environment 300 may also be associated with a user 350 that navigates and moves through the environment. Outside of environment 300 may be neighboring spaces 360. The neighboring spaces 360 may be unrelated to, or otherwise not a part of environment 300. For example, environment 300 may be an apartment of user 350, and neighboring spaces 360 may be a space of an adjacent apartment or common area. Neighboring space 360 may include an unrelated networked device 362. The BBSH may be configured to remove, hide or otherwise prevent access to the unrelated networked device 362 by the user 360. For example, the BBSH may remove the unrelated networked device 362 from a user interface of any of the devices in the environment 360 such that they are unreachable.

The first room 310 may be an office, living room, den, or other relevant space for performing work and/or leisure. The first room 310 may include a plurality of networked devices including a smart television 312, a laptop computer 314, and an environmental sensor 316. The environmental sensor 316 may be configured to receive signals from environment 300. For example, environmental sensor 316 may be a camera or microphone configured to receive and detect a user in the environment based on video signals or audio signals, respectively. The second room 320 may be a bedroom or other space where the user 350 may enter or exit. The second room 320 may have an access point 322. The access point 322 may be configured to receive network communication from other networked devices in the environment 300.

The third room 330 may be a kitchen, dining room, front room, or other relevant space for the user 350. The third room 330 may include a plurality of networked devices including a voice-based assistant ("assistant") 332 and a smart light 334. The fourth room 340 may be a bathroom, utility room, or other relevant room. The fourth room 340 may include a plurality of networked devices including a smart speaker 342, and a smart washing machine 344. As depicted in FIG. 3, the user 350 may be standing in the third room 330 and may have access to the second room 320 and the fourth room 340. The user 350 may be visible to the sensor 316 from the first room 310.

The BBSH may be configured to operate in the environment 300 through one or more edge devices capable of performing processing to identify actions, detect relationships between networked devices, and generate networked device bubbles. For example, smart television 312, laptop computer 314, access point 322, and/or assistant 332 may be edge devices capable of performing within the BBSH. Each of the edge devices may operate as a computer, such as computer 100 of FIG. 1. Each of the edge devices may operate to perform a neural network capable of modeling actions and other networked devices, such as neural network 200 configured to detect a relationship.

Each edge device may perform BBSH by monitoring the environment 300 and detecting or relationships. The edge device may detect relationships by modeling usage patterns and recording history of actions and interactions with users, such as user 350. For example, initially networked device 332 (e.g., the voice-based assistant) may be configured to identify various actions associated with the other networked devices in the environment 300. The assistant 332 may identify a user 350 requesting that music be played, and responsively the assistant may begin playing music. The assistant 332 may identify and record the interaction with the user 350 to play the music. The assistant 332 may at a later time receive a request from the user 350 to dim lights of light 334. The assistant 332 may responsively instruct the light 334 to dim or reduce brightness. The assistant 332 may further identify and record the interaction with the user 350 to dim the light 334.

The assistant 332 may record the actions of the user as a part of performing BBSH. The assistant 332, may identify patterns, behaviors, or relationships based on the recorded and identified interaction in the environment 300. The BBSH operations may include the assistant 332 executing modeling, such as through neural network 200, to detect a relationship between playing music and changing lighting in the third room 330. Based on the BBSH operations, the assistant 332 may determine that there is a high likelihood (e.g., a likelihood that exceeds a predetermined bubble threshold) that the two operations can be joined to form a bubble. For example, assistant 332 may model the behavior of the user 350 over time and determine that when the user 350 requests music to be played by the assistant 332, that it is 78% likely that the user 350 will also request light 334 to be dimmed. The predetermined bubble threshold may be a likelihood over 75%.

Consequently, the assistant 332 may determine that a first networked device bubble 370 should be generated. The first networked device bubble 370 may include a model of the particular actions, networked devices (e.g., the assistant 332 and the light 334), and other associated context information. The associated context information may be based on a pattern or usage of the user 350. For example, the associated context information of the first networked device bubble 370, may indicate that the unrelated actions are to be related only during certain times of day, such as between 10:00 AM and 11:00 AM. In another example, the associated context information may be that the first networked device bubble 370, may be present only when the user 350 is in a certain portion, room, zone, or area of the environment 300, such as in the third room 330. Based on the first networked device bubble 370, the BBSH may initiate one or more of the actions that make up the first networked device bubble 370. For example, a user 350 may request that the light 334 be dimmed. Responsive to receiving a request, the assistant 332 may identify that the action is a part of the first networked device bubble 370, and the BBSH may initiate the operation to play music through the assistant 332.

Networked device bubbles may operate in multiple rooms, zones, or areas of the environment 300. For example, a user may request through assistant 332 that a music video should be played on the smart television 312, the laptop computer 314, and that the light 334 should strobe. Based on modeling these actions of the unrelated devices, a BBSH executing on the assistant 332 may detect a relationship between networked devices in the first room 310 and the third room 330. The BBSH executing on the assistant 332 may generate a second networked device bubble 380. The BBSH may delegate or reassign performance of various operations to one or more other devices. For example, the performance of one or more operations of the BBSH may initially be performed to identify, detect, and generate the second networked device bubble 380. The assistant 332 may determine that one or more operations should be reassigned to another networked device in the environment 300. The determination may include monitoring or communicating with other networked devices in the environment. For example, the assistant 332 may communicate with the laptop computer 314. The assistant 332 may request or monitor the computing resources of the laptop computer 314. The assistant 332 may determine that the overall memory usage of the laptop computer 314 is below a predetermined performance threshold (e.g., less than 20% memory utilization). Based on determining the current performance of the laptop computer 314 is below the predetermined performance threshold, the assistant 332 may assign BBSH operation to the laptop computer 314. Responsively, the laptop computer 314 may monitor for and attempt to identify any action that may be related to the second network device bubble 380.

The BBSH may detect a relationship based on one or more usage patterns of a user. For example, detection of a relationship may be based on modeling the frequency or timing of requesting a certain action from one or more of the networked devices in the environment 300. The BBSH may detect a relationship between devices based on a location or proximity. For example, the BBSH may receive information or signals from a portable device of the user 350, including a smartphone 352 and/or a wearable computing device 354 of the user. The BBSH may be configured to determine that a user is proximate to a smart speaker 342, based on a ping, echolocation, global positioning system, accelerometer data, time-of-flight, or other relevant location detection or movement algorithm in one or more of the portable devices of the user 350. The BBSH may generate a third networked device bubble 390 based on the location of the user.

The BBSH may add other devices or actions to the third networked device bubble 390 automatically. For example, the BBSH may determine the relatively position of the smart washing machine 344 being proximate to the smart speaker 332. The BBSH may determine there is a relationship between the washing machine 344 and the smart speaker 332 without receiving an indication of any relationship from the user, such as solely based on the position of the washing machine 344 and the smart speaker 342. Based on determining this relationship, the BBSH may generate a third networked device bubble 390. As part of generating the third networked device bubble 390, the BBSH may be configured to automatically associate the type of operation of the smart speaker 342 (e.g., playing audio for a user) with the attributes of the washing machine 344 (e.g., a device marked with a tag of generating an undesirable noise). The BBSH may define as part of the third networked device bubble 390, that automatic (e.g., without input of a user) action to pause operation of the washing machine 344, should be initiated upon receiving a request from the user 350 to being playing a podcast on the smart speaker 342.

The BBSH may be configured to receive feedback from a user. For example, based on execution by assistant 332, the BBSH may determine that a user requests smart speaker 342 to play music. The BBSH may identify the request and determine that music playing by the smart speaker 342 upon request of the user, is associated with the third networked device bubble 390. Upon the determination of associated action with the third networked device bubble 390, the BBSH may instruct the smart washing machine 344 to stop operation. The user 350 may indicate to the BBSH (e.g., by saying a voice command to smartphone 352) to resume smart washing machine 344 operation. In response, the BBSH may adjust, update, or otherwise modify the third networked device bubble 390. The update may be to not stop the washing machine 344 at the time of day that the user indicated the washing machine operation should resume. The update may be to not stop the washing machine 344 if music is played on the smart speaker 342, but to continue to stop the washing machine 344 if a podcast is played on the smart speaker 342.

Figure 4:
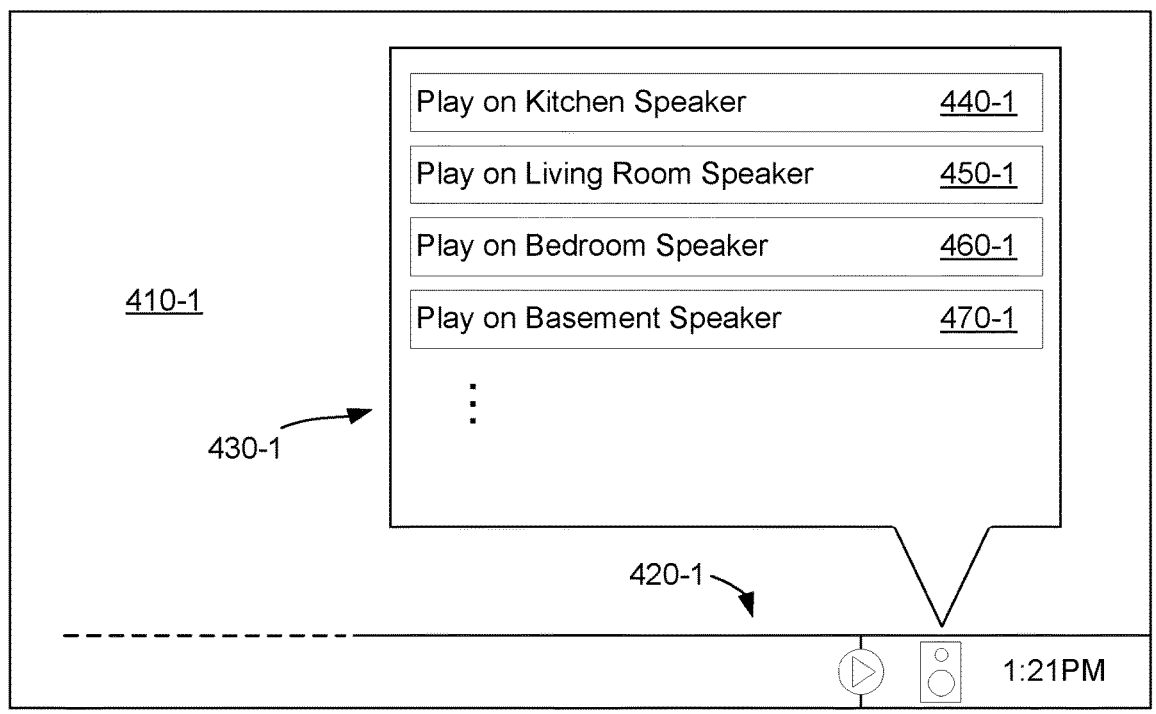
FIG. 4A depicts an example user interface to be operated on by BBSH, consistent with some embodiments of the disclosure.
FIG. 4B depicts an example user interface after performance of BBSH, consistent with some embodiments of the disclosure.

FIG. 4A depicts an example user interface 400-1 to be operated on by BBSH, consistent with some embodiments of the disclosure. User interface 400-1 may be a graphical user interface that is provided to the user at a first time. User interface 400-1 may include a desktop 410-1, a navigation bar 420-1, and a popup menu 430-1. Popup menu 430-1 may be configured to display a plurality of networked devices that may be interactive with by a user. In detail, popup menu 430-1 may include at least a first smart speaker 440-1, a second smart speaker 450-1, a third smart speaker 460-1, and a fourth smart speaker 470-1. The popup menu 430-1 may be provided by a computer system, such as computer 100, for interaction with a user in a smart home environment. The popup menu 430-1 may receive actions from the user, such as the user repeatedly interacting with the first smart speaker 440-1 and the second smart speaker 450-1 immediately after (e.g., within five minutes, within forty-five seconds).

The BBSH may execute on the computer system that provides the user interface 400-1 or that is associated with it. The BBSH may identify interactions and detect relationships with the popup menu 430-1 to invoke action to the plurality of networked devices. Over time (e.g., hours, days, weeks, months), the BBSH may detect relationships and may consequently generate one or more networked device bubbles based on the relationships. In a first example, the BBSH may identify that the user consistently plays music to both the first smart speaker 440-1 and the second smart speaker 450-1, but only from the hours of 12:15 PM to 3:35 PM. In a second example, the BBSH may identify that the user infrequently or never accesses the fourth smart speaker 470-1.

FIG. 4B depicts an example user interface 400-2 after performance of BBSH, consistent with some embodiments of the disclosure. User interface 400-2 may be a graphical user interface that is provided to the user at a second time (e.g., a time that is after the first time depicted in FIG. 4A). User interface 400-2 may include a desktop 410-2, a navigation bar 420-2, and a popup menu 430-2. Popup menu 430-2 may be configured to display a plurality of networked devices after being altered by the BBSH. In detail, popup menu 430-1 may include at least a first networked device bubble 480-2, and the third smart speaker 460-1.

The BBSH may have rendered the popup menu 430-2 by including the first networked device bubble 480-2 based on the relationship determined at a first time (before the generation of the user interface 400-2). The first networked device bubble 480-2 may be labeled based on one or more attributes of the plurality of related networked devices. For example, the words "play" and "speakers" may have been common to both the first smart speaker 440-1 and the second smart speaker 450-1. The first networked device bubble 480-2 may be labeled based on one or more attributes of the behavior or patterns recognized by the BBSH. For example, the time of day, between time between 12:PM and 3:35 PM, that was common to the relationship detected by the BBSH, may be leveraged to use the word "afternoon" in the first networked device bubble 480-2 of popup menu 430-2.

The BBSH may have determined that there is a negative relationship between one or more devices of the environment. For example, the BBSH executing on the computer that provides the user interface 440-2 may generate a second networked device bubble that associates the fourth smart speaker 470-1 and the computer. The negative relationship of the second networked device bubble may indicate that the fourth smart speaker 470-1 is not used with the computer. Responsive to the second networked device bubble, the BBSH may intercept, remove, or otherwise prevent display of the fourth smart speaker 470-1 in the user interface 400-2 at the second time.

The alterations and updates reflected in popup menu 430-2 may provide the user one or more advantages in performing operations. For example, the user may have reduced confusion when interacting with user interface 400-2. In another example, usability and speed of navigation and user may be improved when interacting with user interface 400-2. The alterations and updates reflected in popup menu 430-2 may have other practical benefits. For example, the first smart speaker 440-1, the second smart speaker 450-1, and the fourth smart speaker 470-1 may be removed from a memory or rendering pipeline of a computer that renders user interface 400-2. Consequently, user interface 400-2 may be able to be rendered more quickly, or with reduced memory or processing performance as compared with user interface 400-1.

Figure 5:
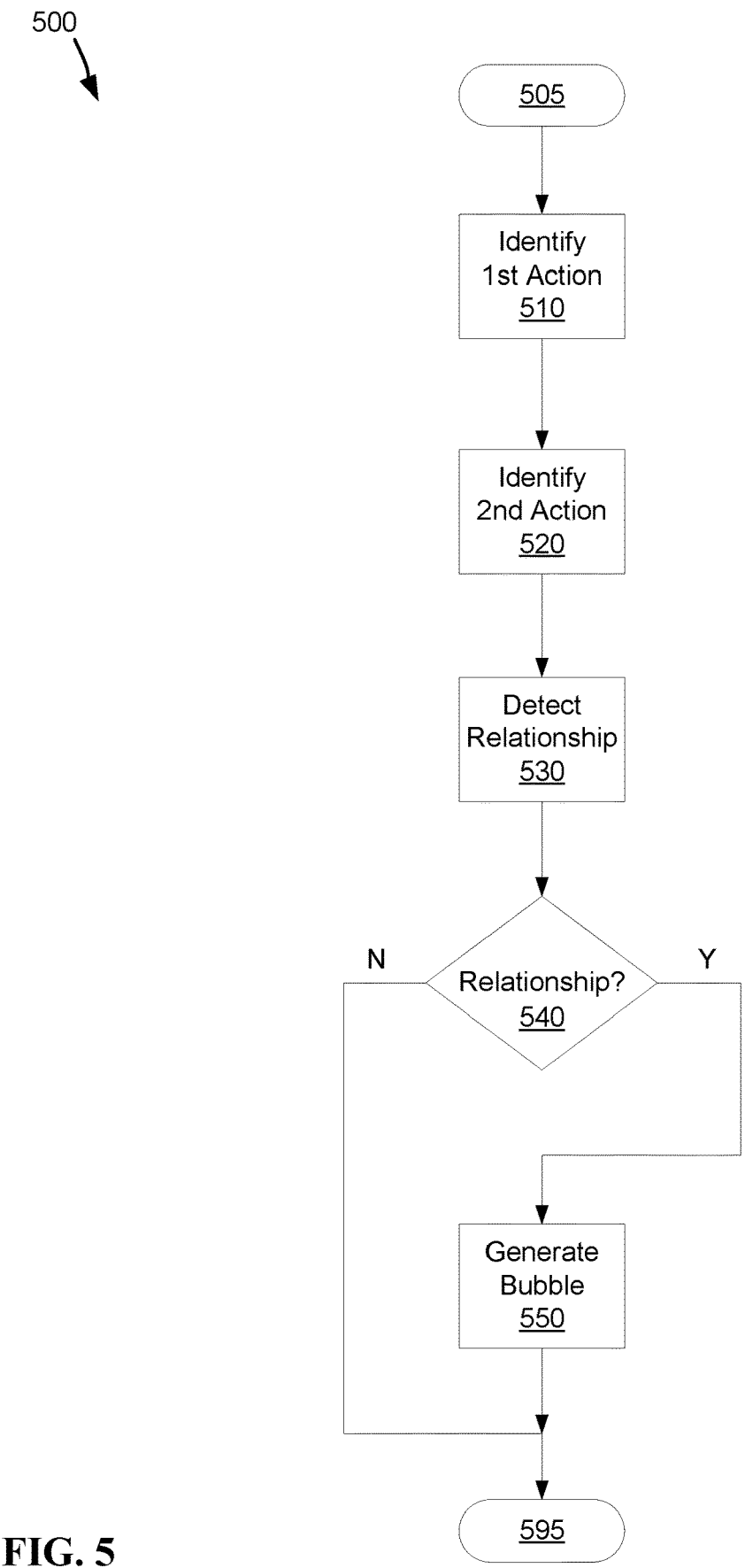
FIG. 5 depicts an example method, to be performed by a BBSH, consistent with some embodiments of the disclosure.

FIG. 5 depicts an example method 500, to be performed by a BBSH, consistent with some embodiments of the disclosure. Method 500 may be executed on a computer system, such as computer 100. Method 500 may be executed by an edge device, such as voice-based assistant 232. Method 500 may be executed by a device delegated to perform one or more operations of a smart home, such as a central server, or laptop computer 314.

From start 505, a first action may be identified at 510. The first action may be associated with a user. The first action may be associated with a first networked device of a plurality of networked devices. For example, a user may get up, walk across a room, and adjust a setting on a stereo. In another example, a user may send a command to a smart speaker through a voice-based assistant or through a smartphone. The first action may be performed by the first networked device (e.g., playing music). At 520, a second action may be identified. The second action may be associated with the same user as the first action. The second action may be associated with another user. For example, a second user may start a slideshow on a smart television. The second action may be directed to a second networked device of the plurality. The second networked device may be unrelated to the first network device. For example, the first networked device may not share a name, task, group, defined function, category, manufacturer, or any other relationship with the second networked device. The first networked device and the second networked device may not have any knowledge of each other. In a first example, the first networked device may be a smart speaker connected to a voice-based assistant through a first personal area network, and the second device may be a laptop computer connected to the voice-based assistant through a second, separate, wireless network.

At 530 a relationship may be detected between the first action of the first networked device and the second action of the second networked device. The relationship may be detected by processing historical data, such as identifying a pattern between the first action and the second action. The relationship may be detected by performing one or more machine learning or artificial intelligence operations on data. For example, neural network 200 may be executed to detect a relationship at 530. If a relationship is detected, at 540:Y, a networked device bubble may be generated at 550. The networked device bubble may be an entry, model, relationship, or other structure configured to enunciate and describe the first action, the second action, the first device, the second device, and other devices or actions. After the network device bubble is generated at 550, or alternatively after a relationship is not detected at 540:N, method 500 ends at 595.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
pairing, by an edge device, a plurality of networked devices in an environment;
generating, by the edge device, a user interface displaying the plurality of networked devices;
training, by the edge device, a neural network for the environment based on training data comprising:
actions of a user input into the plurality of network devices; and
activities of the user recorded by a sensor in the environment;
identifying, by the edge device a first action at a first time, the first action associated with a first networked device of the plurality of networked devices;
identifying, by the edge device a second action, the second action associated with a second networked device of the plurality of networked devices;
detecting, by the edge device using the neural network, a relationship between the first networked device and the second networked device based the first action and the second action;

generating, by the edge device and based on the relationship, a networked device bubble associating the first and second networked devices;
in response to the generating the networked device bubble, updating the user interface to display only the first and second networked devices;
detecting, by the edge device, an additional networked device from the plurality of networked devices;
determining, by the edge device using the neural network, a negative relationship between the additional networked device and the first networked device;
based on the negative relationship, generating a second networked device bubble associating the first networked device and the additional networked device; and
preventing, in response to the generating the second networked device bubble based on the negative relationship, the additional device from being provided to the user of the plurality of network devices by removing displayed information on a user display device.

2. The method of claim 1, further comprising:
identifying, by the edge device, the first action at a second time, the second time after the first time;
determining, by the edge device, the first action at the second time is associated with the networked device bubble; and
initiating, by the edge device and contemporaneously with the second time, the second action of the second networked device.

3. The method of claim 1, further comprising:
determining, by the edge device, a processing performance of a networked device of the plurality of networked devices in the environment;
assigning, by the edge device and based on the processing performance, the networked device bubble to the networked device;
identifying, by the networked device, the first action at a second time, the second time being after the first time;
determining, by the networked device, the first action at the second time is associated with the networked device bubble; and
initiating, by the networked device and contemporaneously with the second time, the second action of the second networked device.

4. The method of claim 1, further comprising:
intercepting the user interface, the user interface including data from the plurality of networked devices; and
hiding, based on the second networked device bubble, data from the additional networked device.

5. The method of claim 4, further comprising:
creating a new networked device entry, the new networked device entry corresponding to the networked device bubble; and
providing the new networked device entry to the user interface.

6. The method of claim 1, wherein the edge device is a voice-based assistant, and wherein the identifying the first action includes identifying a voice command of the user.

7. The method of claim 1, further comprising:
presenting, by the edge device and to the user, a third action, the third action related to the plurality of networked devices in the environment.

8. The method of claim 1, wherein the detecting the relationship is also based on a portable device of the user that initiated the first action.

9. The method of claim 1, further comprising:
identifying, by the edge device based on data from the sensor, a first activity of the user in the environment;
detecting, by the edge device using the neural network, a relationship between the second networked device and the additional networked device based on the identifying the first activity; and
generating, by the edge device and based on the relationship between the second and the additional networked devices, a third networked device bubble associating the second networked device and the additional networked device.

10. The method of claim 9, further comprising updating the user interface to display only the second networked device and the additional networked device at a second time.

11. The method of claim 1, further comprising detecting at least one device in a second environment.

12. The method of claim 11, further comprising, in response to the pairing, preventing the plurality of networked devices from receiving transmissions from the at least one device.

13. A system, the system comprising:
a memory, the memory containing one or more instructions; and
a processor, the processor communicatively coupled to the memory, the processor, in response to reading the one or more instructions, configured to:
pair, by an edge device, a plurality of networked devices in an environment;
generate, by the edge device, a user interface displaying the plurality of networked devices;
train, by the edge device, a neural network for the environment based on training data comprising:
actions of the user input into the plurality of network devices; and
activities of the user recorded by a sensor in the environment;
identify, by the edge device a first action at a first time, the first action associated with a first networked device of the plurality of networked devices;
identify, by the edge device a second action, the second action associated with a second networked device of the plurality of networked devices;
detect, by the edge device using the neural network, a relationship between the first networked device and the second networked device based on the first action and the second action;
generate, by the edge device and based on the relationship, a networked device bubble associating the first and second networked devices at the first time;
in response to the generating the networked device bubble, update the user interface to display only the first and second networked devices at the first time;
detect, by the edge device, an additional networked device from the plurality of networked devices;
determine, by the edge device using the neural network, a negative relationship between the additional networked device and the first networked device;
based on the negative relationship, generate a second networked device bubble associating the first networked device and the additional networked device; and
prevent, in response to the generating the second networked device bubble based on the negative relationship, the additional device from being provided to the user of the plurality of network devices by removing displayed information on a user display device.

14. The system of claim 13, wherein the processor is further configured to:
- identify, by the edge device, the first action at a second time, the second time after the first time;
- determine, by the edge device, the first action at the second time is associated with the networked device bubble; and
- initiate, by the edge device and contemporaneously with the second time, the second action of the second networked device.

15. The system of claim 13, wherein the processor is further configured to:
- determine, by the edge device, a processing performance of a networked device of the plurality of networked devices in the environment;
- assign, by the edge device and based on the processing performance, the networked device bubble to the networked device;
- identify, by the networked device, the first action at a second time, the second time after the first time;
- determine, by the networked device, the first action at the second time is associated with the networked device bubble; and
- initiate, by the networked device and contemporaneously with the second time, the second action of the second networked device.

16. A computer program product, the computer program product comprising:
- one or more computer readable storage media; and
- program instructions collectively stored on the one or more computer readable storage media, the program instructions configured to:
  - pair, by an edge device, a plurality of networked devices in an environment;
  - generate, by the edge device, a user interface displaying the plurality of networked devices;
  - train, by the edge device, a neural network for the environment based on training data comprising:
    - actions of the user input into the plurality of network devices; and
    - activities of the user recorded by a sensor in the environment;
  - identify, by the edge device a first action at a first time, the first action associated with a first networked device of the plurality of networked devices;
  - identify by the edge device a second action, the second action associated with a second networked device of the plurality of networked devices;
  - detect, by the edge device using the neural network, a relationship between the first networked device and the second networked device based on the first action and the second action;
  - generate, by the edge device and based on the relationship, a networked device bubble associating the first and second networked devices at the first time;
  - in response to the generating the networked device bubble, update the user interface to display only the first and second networked devices at the first time;
  - detect, by the edge device, an additional networked device from the plurality of networked devices;
  - determine, by the edge device using the neural network, a negative relationship between the additional networked device and the first networked device;
  - based on the negative relationship, generate a second networked device bubble associating the first networked device and the additional networked device; and
  - prevent, in response to the generating the second networked device bubble based on the negative relationship, the additional device from being provided to the user of the plurality of network devices by removing displayed information on a user display device.

17. The computer program product of claim 16, wherein the program instructions are further configured to:
- intercept the user interface, the user interface including the plurality of networked devices; and
- hide, based on the second networked device bubble, data from the additional networked device.

18. The computer program product of claim 17, wherein the program instructions are further configured to:
- create a new networked device entry, the new networked device entry corresponding to the networked device bubble; and
- provide the new networked device entry to the user interface.

19. The computer program product of claim 16, wherein the edge device is a voice-based assistant, and wherein the identifying the first action includes identifying a voice command of the user.

20. The computer program product of claim 16, wherein the program instructions are further configured to:
- present, by the edge device and to the user, a third action, the third action related to the plurality of networked devices in the environment.

* * * * *